US006654018B1

(12) United States Patent
Cosatto et al.

(10) Patent No.: US 6,654,018 B1
(45) Date of Patent: Nov. 25, 2003

(54) AUDIO-VISUAL SELECTION PROCESS FOR THE SYNTHESIS OF PHOTO-REALISTIC TALKING-HEAD ANIMATIONS

(75) Inventors: Eric Cosatto, Highlands, NJ (US); Hans Peter Graf, Lincroft, NJ (US); Gerasimos Potamianos, White Plains, NY (US); Juergen Schroeter, New Providence, NJ (US)

(73) Assignee: AT&T Corp., New York, NY (US)

( * ) Notice: Subject to any disclaimer, the term of this patent is extended or adjusted under 35 U.S.C. 154(b) by 242 days.

(21) Appl. No.: 09/820,396

(22) Filed: Mar. 29, 2001

(51) Int. Cl.[7] .............................................. G06T 13/00
(52) U.S. Cl. ...................................................... 345/473
(58) Field of Search .......................................... 345/473

(56) References Cited

U.S. PATENT DOCUMENTS 4,827,532 A * 5/1989 Bloomstein ................. 382/100
6,072,496 A * 6/2000 Guenter et al. ............. 345/419
6,449,595 B1 * 9/2002 Arslan et al. ............... 704/235
6,496,594 B1 * 12/2002 Prokoski ..................... 382/118

* cited by examiner

*Primary Examiner*—Joseph Mancuso
*Assistant Examiner*—Adam Arnold

(57) ABSTRACT

A system and method for generating photo-realistic talking-head animation from a text input utilizes an audio-visual unit selection process. The lip-synchronization is obtained by optimally selecting and concatenating variable-length video units of the mouth area. The unit selection process utilizes the acoustic data to determine the target costs for the candidate images and utilizes the visual data to determine the concatenation costs. The image database is prepared in a hierarchical fashion, including high-level features (such as a full 3D modeling of the head, geometric size and position of elements) and pixel-based, low-level features (such as a PCA-based metric for labeling the various feature bitmaps).

21 Claims, 3 Drawing Sheets

AUDIO-VISUAL SELECTION PROCESS FOR THE SYNTHESIS OF PHOTO-REALISTIC TALKING-HEAD ANIMATIONS

TECHNICAL FIELD

The present invention relates to the field of talking-head animations and, more particularly, to the utilization of a unit selection process from databases of audio and image units to generate a photo-realistic talking-head animation.

BACKGROUND OF THE INVENTION

Talking heads may become the "visual dial tone" for services provided over the Internet, namely, a portion of the first screen an individual encounters when accessing a particular web site. Talking heads may also serve as virtual operators, for announcing events on the computer screen, or for reading e-mail to a user, and the like. A critical factor in providing acceptable talking head animation is essentially perfect synchronization of the lips with sound, as well as smooth lip movements. The slightest imperfections are noticed by a viewer and usually are strongly disliked.

Most methods for the synthesis of animated talking heads use models that are parametrically animated from speech. Several viable head models have been demonstrated, including texture-mapped 3D models, as described in the article "Making Faces", by B. Guenter et al, appearing in *ACM SIGGRAPH,* 1998, at pp. 55–66. Parameterized 2.5D models have also been developed, as discussed in the article "Sample-Based Synthesis of Photo-Realistic Talking-Heads", by E. Cosatto et al, appearing in *IEEE Computer Animations,* 1998. More recently, researchers have devised methods to learn parameters and their movements from labeled voice and video data. Very smooth-looking animations have been provided by using image morphing driven by pixel-flow analysis.

An alternative approach, inspired by recent developments in speech synthesis, is the so-called "sample-based", "image-driven", or "concatenative" technique. The basic idea is to concatenate pieces of recorded data to produce new data. As simple as it sounds, there are many difficulties associated with this approach. For example, a large, "clean" database is required from which the samples can be drawn. Creation of this database is problematic, time-consuming and expensive, but the care taken in developing the database directly impacts the quality of the synthesized output. An article entitled "Video Rewrite: Driving Visual Speech with Audio" by C. Bregler et al. and appearing in *ACM SIJGGRAPH,* 1997, describes one such sample-based approach. Bregler et al. utilize measurements of lip height and width, as well as teeth visibility, as visual features for unit selection. However, these features do not fully characterize the mouth. For example, the lips and presence of the tongue, or the presence of the lower and upper teeth, all influence the appearance of the mouth. Bregler et al. is also limited in that it does not perform a full 3D modeling of the head, instead relying on a single plane for analysis, making it impossible to include cheek areas that are located on the side of the head, as well as the forehead. Further, Bregler et al. utilize triphone segments as the a priori units of video, which sometimes renders the resultant synthesis to lack a natural "flow".

SUMMARY OF THE INVENTION

The present invention relates to the field of talking-head animations and, more particularly, to the utilization of a unit selection process from databases of audio and image units to generate a photo-realistic talking-head animation.

More particularly, the present invention relates to a method of selecting video animation snippets from a database in an optimal way, based on audio-visual cost functions. The animations are synthesized from recorded video samples of a subject speaking in front of a camera, resulting in a photo-realistic appearance. The lip-synchronization is obtained by optimally selecting and concatenating variable-length video units of the mouth area. Synthesizing a new speech animation from these recorded units starts with audio speech and its phonetic annotation from a text-to-speech synthesizer. Then, optimal image units are selected from the recorded set using a Viterbi search through a graph of candidate image units. Costs are attached to the nodes and the arcs of the graph, computed from similarities in both the acoustic and visual domain. Acoustic similarities may be computed, for example, by simple phonetic matching. Visual similarities, on the other hand, require a hierarchical approach that first extracts high-level features (position and sizes of facial parts), then uses a 3D model to calculate the head pose. The system then projects 3D planes onto the image plane and warps the pixels bounded by the resulting quadrilaterals into normalized bitmaps. Features are then extracted from the bitmaps using principal component analysis of the database. This method preserves coarticulation and temporal coherence,.producing smooth, lip-synched animations.

In accordance with the present invention, once the database has been prepared (off-line), on-line (i.e., "real time") processing of text input can then be used to generate the talking-head animation synthesized output. The selection of the most appropriate video frames for the synthesis is controlled by using a "unit selection" process that is similar to the process used for speech synthesis. In this case, audio-visual unit selection is used to select mouth bitmaps from the database and concatenate them into an animation that is lip-synched with the given audio track.

Other and further aspects of the present invention will become apparent during the course of the following discussion and by reference to the accompanying drawings.

BRIEF DESCRIPTION OF THE DRAWINGS

Referring now to the drawings.

DETAILED DESCRIPTION

As will be discussed in detail below, the system of the present invention comprises two major components: off-line processing to create the image database 30 (which occurs only once, with (perhaps) infrequent updates to modify the database entries), and on-line processing for synthesis. The system utilizes a combination of geometric and pixel-based metrics to characterize the appearance of facial parts, plus a full 3D head-pose estimation to compensate for different orientations. This enables the system to find similar-looking mouth images from the database, making it possible to synthesize smooth animations. Therefore, the need to morph dissimilar frames into each other is avoided, an operation that adversely affects lip synchronization. Moreover, instead of segmenting the video sequences a priori (as in Bregler et al.), the unit selection process itself dynamically finds the best segment lengths. This additional flexibility helps the synthesizer use longer contiguous segments of original video, resulting in animations that are more lively and pleasing.

Figure 1:
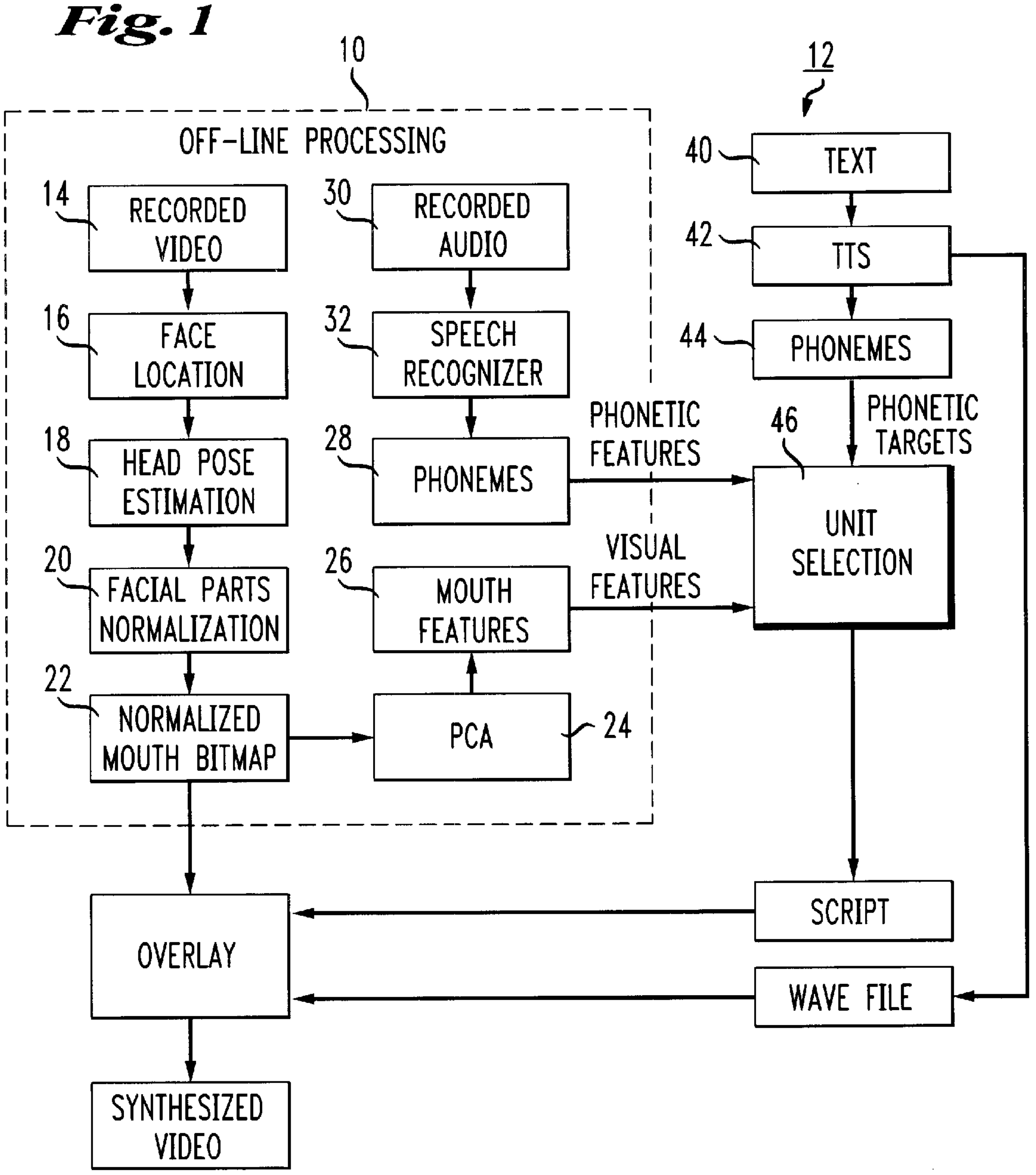
FIG. 1 contains a simplified block diagram of the overall talking-head synthesis system of the present invention, illustrating both the off-line database creation aspect as well as the on-line synthesis process.

FIG. 1 illustrates a simplified block diagram of the system of the present invention. As mentioned above, the system includes an off-line processing section 10 related to the creation of the database and an on-line processing section 12 for real-time text-to-speech synthesis. Database creation includes two separate portions, one related to "audio" and one related to "video". The video portion of database creation begins, as shown, with recording video (block 14). Obtaining robust visual features from videos of a talking person is no simple task. Since parts of the prerecorded images are used to generate new images, the locations of facial features have to be determined with sub-pixel accuracy. Use of props or markers to ease feature recognition and tracking results in images that have to be post-processed to remove these artifacts, in turn reducing their quality. Part of the difficulty arises from letting subjects move their heads naturally while speaking. Early experiments with subjects whose heads were not allowed to move resulted in animations that looked unnatural. In the process of the present invention, therefore, the subject is allowed to speak in front of the camera with neither head restraints nor any facial markers. Advanced computer vision techniques are then used to recognize and factor out the head pose before extracting features with high accuracy. Using the head pose, a normalized view of the area around the mouth can be obtained before applying a second round of feature extraction. This type of hierarchical feature extraction, in accordance with the present invention, allows for using low-level features that require image registration.

Referring to FIG. 1, the first step in obtaining normalized mouth bitmaps is to locate the face on the recorded videos (step 16). A wide variety of techniques exist to perform this task. One exemplary method that may be used in the system of the present invention is the model-based, multi-modal, bottom-up approach, as described in the article "Robust Recognition of Faces and Facial Features with a Multi-Modal System" by H.P. Graf et al, appearing in IEEE Systems, Man and Cybernetics, 1997, at pp. 2034–39, and herein incorporated by reference. Separate shape, color and motion channels are used to estimate the position of facial features such as eyes, nostrils, mouth, eyebrows and head contour. Candidates for these parts are found from connected pixels and are scored using n-grams against a standard model. The highest scoring combination is taken to be a head, giving (by definition) the positions of eyes and nostrils on the image. A second pass uses specialized, learned convolution kernels to obtain a more precise estimate of the position of sub-parts, such as eye-corners.

To find the position and orientation of the head (i.e., the "pose", step 18), a pose estimation technique, such as described in the article "Iterative Pose Estimation Using Coplanar Feature Points" by D. Oberkampf et al, Internal Report CVL, CAR-TR-677, University of Maryland, 1993, may be used. In particular, a rough 3D model of the subject is first obtained using at least four coplanar points (for added precision, for example, six points may be used: the four eye corners and two nostrils), where the points are measured manually on calibrated photographs of the subject's face (frontal and profile views). Next, the corresponding positions of these points in the image are obtained from the face recognition module. Pose estimation begins with the assumption that all model points lie in a plane parallel to the image plane (i.e., corresponds to an orthographic projection of the model into the image plane, plus a scaling). Then, by iteration, the algorithm adjusts the model points until their projections into the image plane coincide with the observed image points. The pose of the 3D head model (referred to as the "object" in the following discussion), can then be obtained by iteratively solving the following linear system of equations:

$$\left\{\begin{array}{l} M_k \cdot \frac{f}{Z_0} i = x_k(1+\varepsilon_k) - x_0 \\ M_k \cdot \frac{f}{Z_0} j = y_k(1+\varepsilon_k) - y_0 \end{array}\right\}$$

$M_k$ is defined as the 3D position of the object point k, i and j are the two first base vectors of the camera coordinate system in object coordinates, f is the focal length, and $Z_0$ is the distance of the object origin from the camera. i, j and $Z_0$ are the unknown quantities to be determined, $(x_k, y_k)$ is the scaled orthographic projection of the model point k, $(x_0, y_0)$ is the origin of the model in the same plane, and $\epsilon_k$ is a correction term due to the depth of the model point, where $\epsilon_k$ is adjusted at each iteration until the algorithm converges.

This algorithm is numerically very stable, even with measurement errors, and it converges in just a few iterations. Using the recovered angles and position of the head, a 3D plane can be projected bounding the facial parts onto the image plane (step 20). The resulting quadrilateral is used to warp the bounded pixels into a normalized bitmap (step 22). Although the following discussion will focus on the mouth area, this operation is performed for each facial part needed for the synthesis.

Figure 2:
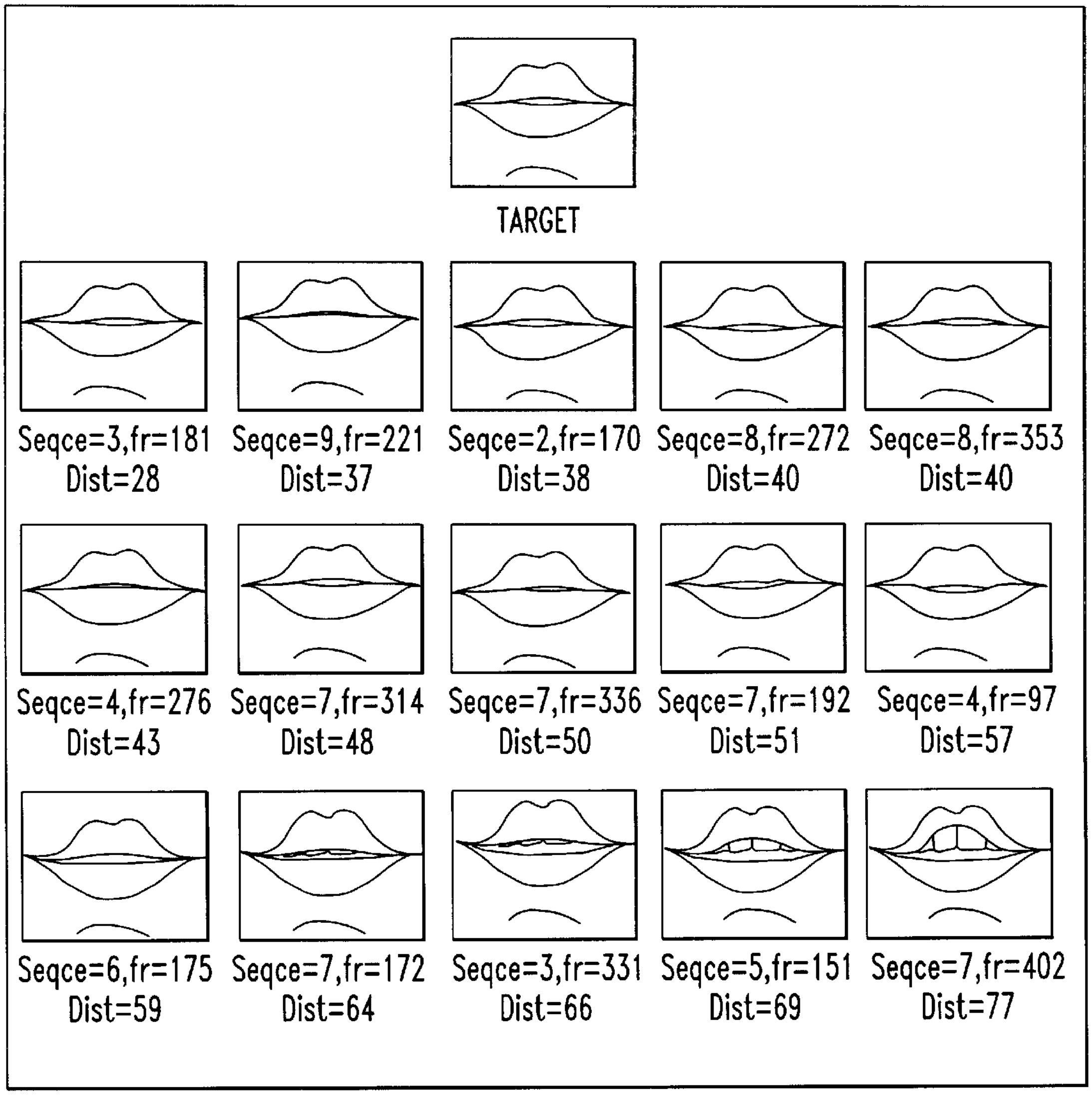
FIG. 2 contains exemplary frames from a created database, using principal components as a distance metric and illustrating the 15 "closest" database segment to a given target frame.

The next step in the database construction process is to pre-compute a set of features that will be used to characterize the visual appearance of a normalized facial part image. In one embodiment of the invention, the set of features include the size and position of facial elements such as lips, teeth, eye corners, etc., as well as values obtained from projecting the image into a set of principal components obtained from principal component analysis (PCA) on the entire image set. It is to be understood that PCA components are only one possible way to characterize the appearance of the images. Alternative techniques exist, such as using wavelets or templates. PCA components are considered to be a preferred embodiment since they tend to provide very compact representations, with only a few components required to capture a wide range of appearances. Another useful feature is the pose of the head, which provides a measure of similarity of the head post and henceforth of the appearance and quality of a normalized facial part. Such a set of features defines a space in which the Euclidean distance between two images can be directly related to their difference as perceived by a human observer. Ultimately, the goal is to find a metric that enables the unit selection module to generate "smooth" talking-head animation by selecting frames from the database that are "visually close". FIG. 2 illustrates an exemplary result of PCA, in this case showing both the target unit and the 15 closest images (in terms of Euclidean distance). PCA is utilized, in accordance with the present invention, since it provides a compact representation and captures the appearance of the mouth with just a few parameters. More particularly for PCA, luminance images are sub-sampled and packed into a vector and the vectors are stacked into a data matrix. If the size of an image vector is n and the number of images is m, then the data matrix M is an n×m matrix. PCA is performed by calculating the eigenvectors of the n×n covariance matrix of the vectors. The process of feature extraction is then reduced to projecting a vector onto the first few principal components (i.e., eigenvectors with the largest eigenvalues). In practice, it has been found that the first twelve eigenvectors provided sufficient discrimination to yield a useful metric.

In the particular process of creating database 26, the original "raw" videos of the subjects articulating sentences were processed to extract the following files: (1) video files of the normalized mouth area; (2) some whole-head videos to provide background images; (3) feature files for each mouth; and (4) phonetic transcripts of all sentences. The size of database 26 is directly related to the quality required for animations, where high quality lip-synchronization requires more sentences and higher image resolution requires larger files. Phoneme database 28 is created in a conventional fashion by first recording audio test sentences or phrases (step 30, then utilizing a suitable speech recognition algorithm (step 32) to extract the various phonemes from the recorded speech.

Once off-line processing section 10 is completed, both video features database 26 (illustrated as only "mouth" features in FIG. 1; it is to be understood that any other facial feature utilized for synthesis is similarly processed and stored in the video feature database 26) and phoneme database 28 are ready to be used in the unit selection process of performing on-line, real-time audio-visual synthesis. Referring back to FIG. 1, a new animation is synthesized by first running the input ascii text 40 through a text-to-speech synthesizer 42, generating both the audio track and its phonetic transcript (step 44). A video frame rate is chosen which, together with the length of the audio, determines the number of video frames that need to be synthesized. Each video frame is built by overlaying bitmaps of face parts to form a whole face using, for example, the method described in Cosatto et al, ibid.

To achieve synchronization of the mouth with the audio track, while keeping the resulting animation smooth and pleasing to the eye, it is proposed in accordance with the present invention to use a "unit selection" process (illustrated by process 46 in FIG. 1), where unit selection has in the past been a technique used in concatenative speech synthesis. In general, "unit selection" is driven by two separate cost functions: a "target" cost and a "concatenative" cost.

Figure 3:
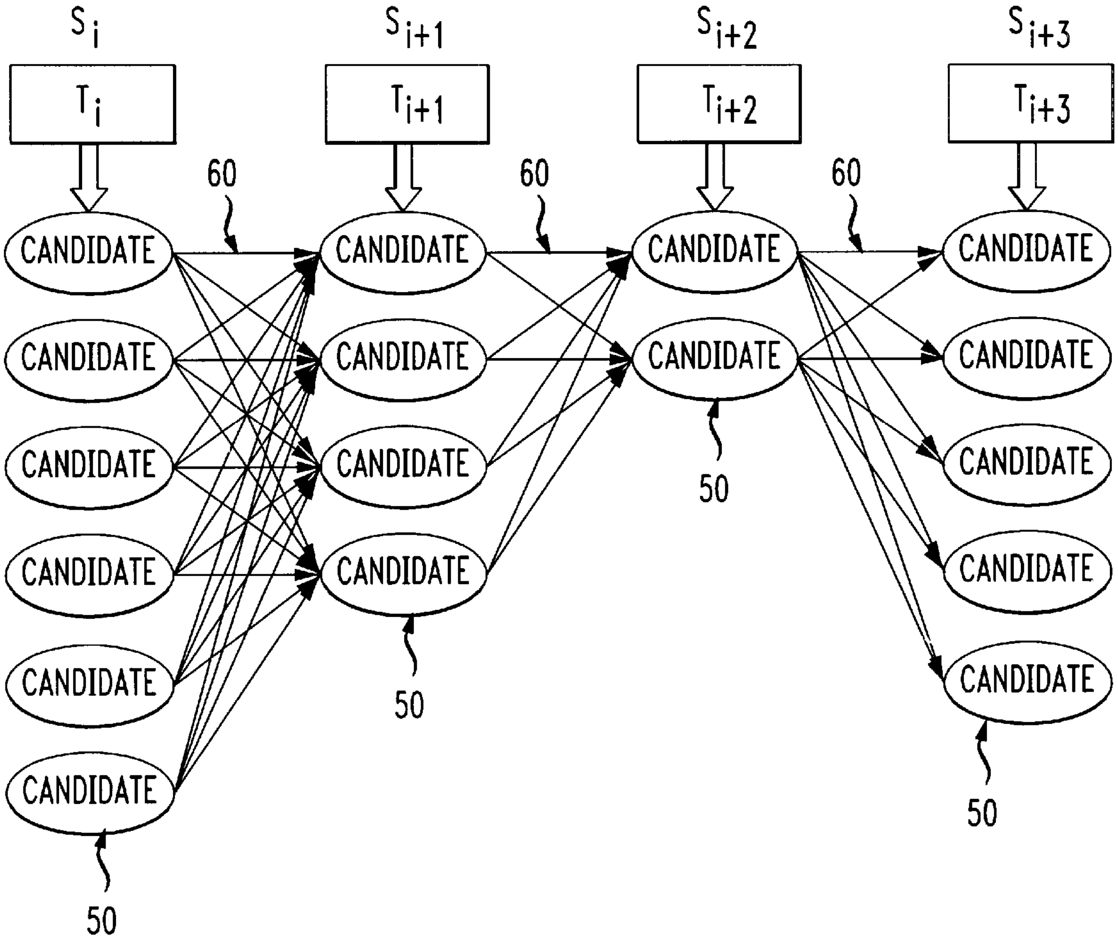
FIG. 3 is a graph illustrating the unit selection process of the present invention for an exemplary stream of four units within an overall synthesis output.

FIG. 3 illustrates the unit selection process of the present invention in the form of a graph with n states corresponding to n frames of a final animation as it is being built. The portion of the graph illustrated in FIG. 3 comprises states $S_i$, a "target" video frame $T_i$ for each state, and a list of candidates 50 for each target. In particular, each state S contains a list of candidate images 50 from video database 26 and is fully connected to the next state, as shown, by a set of arcs 60. As mentioned above, each candidate has a target cost (TC), and two consecutive candidates generate a concatenation cost (CC). The number of candidates at each state may be limited by a maximum target cost. A Viterbi search through the graph finds the optimum path, that is, the "least cost" path through the states.

In accordance with the audio-video unit selection process of the present invention, the task is to balance two competing goals. On the one hand, it is desired to insure lip synchronization. Working toward this goal, the target cost TC uses phonetic and visemic context to select a list of candidates that most closely match the phonetic and visemic context of the target. The context spans several frames in each direction to ensure that coarticulation effects are taken into account. On the other hand, it is desired to ensure "smoothness" in the final animation. To achieve this goal, it is desirous to use the longest possible original segments from the database. The concatenation cost works toward this goal by penalizing segment transitions and insuring that when it is needed to transition to another segment, a candidate is chosen that is visually close to its predecessor, thus generating the smoothest possible transition. The concatenation cost has two distinct components—the skip cost and the transition cost—since the visual distance between two frames cannot be perfectly characterized. That is, the feature vector of an image provides only a limited, compressed view of its original, so that the distance measured between two candidates in the feature space cannot always be trusted to ensure perfect smoothness of the final animation. The additional skip cost is a piece of information passed to the system which indicates that consecutively recorded frames are, indeed, smoothly transitioning.

The target cost is a measure of how much distortion a given candidate's features have when compared to the target features. The target feature vector is obtained from the phonetic annotation of a given frame of the final animation. The target feature vector at frame t, defined as $T(t)=\{ph_{t-nl}, ph_{t-nl-1}, \ldots, ph_{t-1}, ph_t, ph_{t+1}, \ldots, ph_{t+nr-1}, ph_{t-nr}\}$, is of size nl+nr+1, where nl and nr are, respectively, the extent (in frames) of the coarticulation left and right of the coarticulation $ph_t$(the phoneme being spoken at frame t). A weight vector of the same size, defined as $W(t)=\{W_{t-nl}, W_{t-nl-1}, \ldots, W_{t-1}, W_t, W_{t+1}, \ldots, W_{t+nr-1}, W_{t-nr}\}$, where $$w_i=e^{-\alpha|t-1|}, i\epsilon[t-nl;t+nr]$$

This weight vector simulates coarticulation by giving an exponentially decaying influence to phonemes, as they are further away from the target phoneme. The values of nl, nr and α are not the same for every phoneme. Therefore, a table look-up can be used to obtain the particular values for each target phoneme. For example, with the "silence" phoneme, the coarticulation might extend much longer during a silence preceding speech than during speech itself, requiring nl and nr to be larger, and α smaller. This is only one example, a robust system may comprise an even more elaborate model.

For a given target and weight vector, the entire features database is searched to find the best candidates. A candidate extracted from the database at frame "u" has a feature vector $U(u)=\{ph_{u-nl}, ph_{u-nl-1}, \ldots, ph_{u-1}, ph_u, ph_{u+1}, \ldots, ph_{u+nr-1}, ph_{u-nr}\}$. It is then compared with the target feature vector. The target cost for frame t and candidate u is then given by the following:

$$TC(t, u) = \frac{1}{\sum_{i=-nl}^{nr} w_{t+i}} \sum_{i=nl}^{nr} w_{t+i} \cdot M(T_{t+i}, U_{u+i}),$$

where $M(ph_i, ph_i)$ is a pxp "viseme distance matrix" where p is the number of phonemes in the alphabet. This matrix denotes visual similarities between phonemes. For example, the phonemes {m,b,p}, while different in the acoustic domain, have a very similar appearance in the visual domain and their "viseme distance" will be small. This viseme distance matrix is populated with values derived in prior art references on visemes. Therefore, the target cost TC measures the distance of the audio-visual coarticulation context of a candidate with respect to that of the target. To reduce the complexity of Viterbi search used to find candidates, it is acceptable to set a maximum number of candidates that are to be selected for each state.

Once candidates have been selected for each state, the graph of FIG. 3 is constructed and each arc 60 is given a concatenation cost that measures the distance between a candidate of a given state and a candidate of the previous state. Both candidates u1 (from state i) and u2 (from state i−1), have a feature vector U1, U2, calculated from the projection of their respective image (i.e., pixels) onto the k first principal components of the database, as discussed above. This feature vector can be expanded to include additional features such as high level features (e.g., lip width and height) obtained from the facial analysis module described above. The concatenation cost is thus defined as CC(u1, u2)=f((U1, U2)+g(u1, u2), where $$f(U1, U2) = \frac{1}{\sqrt{k}}\sqrt{\sum_{i=1}^{k}(U1_i - U2_i)^2}$$

is the Euclidean distance in the feature space. This cost reflects the visual difference between two candidate images as captured by the chosen features. The remaining cost component g(u1, u2) is defined as follows:

$$g(u1, u2) = \begin{cases} 0 & \text{when} \quad fr(u1) - fr(u2) = 1 \wedge seq(u1) = seq(u2) \\ w_1 & \text{when} \quad fr(u1) - fr(u2) = 0 \wedge seq(u1) = seq(u2) \\ w_2 & \text{when} \quad fr(u1) - fr(u2) = 2 \wedge seq(u1) = seq(u2) \\ & \vdots \\ w_{p-1} & \text{when} \quad fr(u1) - fr(u2) = p = 1 \wedge seq(u1) = seq(u2) \\ w_p & \text{when} \quad fr(u1) - fr(u2) \geq p \vee fr(u1) - fr(u2) < 0 \\ & \qquad \vee\, seq(u1) \neq seq(u2) \end{cases}$$

where $0<w_1<w_2<\ldots<w_p$, seq(u)=recorded_sequence_number and fr(u)=recorded_frame_number, is a cost for skipping consecutive frames of a sequence. This cost helps the system to avoid switching too often between recorded segments, thus keeping (as much as possible) the integrity of the original recordings. In one embodiment of the present invention, p=5 and $w_i$, increases exponentially. In this way, the small cost of $w_1$ and $w_2$ allows for varying the length of a segment by occasionally skipping a frame, or repeating a frame to adapt its length (i.e., scaling). The high cost of $w_5$, however, ensures that skipping more than five frames incurs a high cost, avoiding jerkiness in the final animation.

Referring in particular to FIG. 3, the graph as shown has been constructed with a target cost TC for each candidate 50 and concatenative cost CC for each arc 60 going candidates in contiguous states. A path $\{p_0, p_1, \ldots, p_n\}$ through this graph then generates the following cost:

$$c = WTC \cdot \sum_{i=0}^{n} TC(t, S_{t-pi}) + WCC \cdot \sum_{t+1}^{n} CC(S_{t,pi}, S_{t-1,pi-1})$$

The best path through the graph is thus the path that produces the minimum cost. The weights WTC and WCC are used to fine-tune the emphasis given to concatenation cost versus target cost, or in other words, to emphasize acoustic versus visual matching. A strong weight given to concatenation cost will generate very smooth animation, but the synchronization with the speech might be lost. A strong weight given to target cost will generate an animation which is perfectly synchronized to the speech, but might appear visually choppy or jerky, due to the high number of skips within database sequences.

Of significant importance for the visual quality of the animation formed in the accordance with the present invention is the size of the database and, in particular, how well it targets the desired output. For example, high quality animations are produced when few, fairly large segments (e.g., larger than 400 ms) can be taken as a whole from the database within a sentence. For this to happen, the database must contain a significantly large number of sample sentences.

With this selection of units for each state being completed, the selected units are then output from selection process 46 and compiled into a script (step 48) for final animation. Referring to FIG. 1, the final animation is then formed by overlaying the three units necessary for synchronization: (1) normalized face bitmap; (2) lip-synchronized video; and (3) the audio wavefile output from text-to-speech synthesizer 42 (step 50). Accordingly, these three sources are combined so as to overlay one another and form the final synthesized video output (step 52).

Even though the above description has emphasized the utilization of the unit selection process with respect to the mouth area, it is to be understood that the process of the present invention may be used to provide for photo-realistic animation of any other facial part and, in more generally, can be used with virtually any object that is to be animated. For these objects, for example, there might be no "audio" or "phonetic" context associated with an image sample; however, other high-level characterizations can be used to label these object image samples. For example, an eye sample can be labeled with a set of possible expressions (squint, open wide, gaze direction, etc.). These labels are then used to compute a target cost TC, while the concatenation cost CC is still computed using a set of visual features, as described above.

What is claimed is:

1. A method for the synthesis of photo-realistic animation of an object using a unit selection process, comprising the steps of:

a) creating a first database of image samples showing an object in a plurality of appearances;

b) creating a second database of visual features for each image sample of the object;

c) creating a third database of non-visual characteristics of the object in each image sample;

d) obtaining for each frame in a plurality of N frames of an animation, a target feature vector comprised of the visual features and the non-visual characteristics;

e) for each frame in the plurality of N frames of the animation, selecting candidate image samples from the first database using a comparison of a combination of visual features from the second database and non-visual characteristics from the third databases with the target feature vector; and f) compiling the selected candidates to form a photo-realistic animation.

2. The method as defined in claim 1 wherein the visual features of the second database are extracted from intermediate images representing normalized sub-parts of the object obtained from the image sample of the first database.

3. The method as defined in claim 2 wherein the normalized sub-parts of the object are obtained by:

a) calculating a pose of the object as it appears on an image sample of the first database; and b) reprojecting the object onto an intermediate image using a normalized pose.

4. The method as defined in claim 3 wherein the pose of the object is calculated using a set of at least four 3D object points and their corresponding image projection and applying standard pose estimation algorithms.

5. The method as defined in claim 3 wherein the step of reprojection further comprises:

a) projecting 3D quadrilaterals defining the overall shape of the object on the image using the object's calculated pose, marking 2D quadrilateral boundaries;

b) projecting the same quadrilaterals onto an intermediate image using a standard pose, marking a second set of 2D quadrilaterals; and c) performing a quadrilateral-to-quadrilateral mapping for each quadrilateral in the object from the image sample to the intermediate, normalized image.

6. The method as defined in claim 2 wherein the features comprise the projections of the normalized sub-part image onto a subset of its principal components, the principal components being calculated from a set of available normalized sub-part images using a principal component analysis (PCA).

7. The method as defined in claim 2 wherein the visual features comprise a wavelet decomposition of the images, each image is transformed with a wavelet transform, and a subset of the wavelet coefficients is selected as feature vectors for the images.

8. The method as defined in claim 2 wherein the visual features comprise a projection onto a set of selected template images and a pixel-by-pixel multiplication is calculated to generate coefficients representing feature vectors for the images.

9. The method as defined in claim 6 wherein PCA is performed on subsampled and cropped images of the normalized image samples.

10. The method as defined in claim 6 wherein PCA is performed on luminance images of the normalized image samples.

11. The method as defined in claim 1 wherein selecting candidate image samples from the first database further comprises:

a) selecting, for each frame, a number of candidates image samples from the first database based on the target feature vector;

b) calculating, for each pair of candidates of two consecutive frames, a concatenation cost from a combination of visual features from the second database and object characteristics from the third database; and c) performing a Viterbi search to find the least expensive path through the candidates accumulating a target cost and concatenation costs.

12. The method as defined in claim 11, wherein the concatenation cost is given by the Euclidian distance in the space of visual features between two candidates.

13. The method as defined in claim 12 wherein an additional concatenation cost g is calculated from the respective recording timestamps of the image samples u1, u2 using the following formula:

$$g(u1, u2) = \begin{cases} 0 & \text{when} \quad fr(u1) - fr(u2) = 1 \wedge seq(u1) = seq(u2) \\ w_1 & \text{when} \quad fr(u1) - fr(u2) = 0 \wedge seq(u1) = seq(u2) \\ w_2 & \text{when} \quad fr(u1) - fr(u2) = 2 \wedge seq(u1) = seq(u2) \\ \vdots & \\ w_{p-1} & \text{when} \quad fr(u1) - fr(u2) = p - 1 \wedge seq(u1) = seq(u2) \\ w_p & \text{when} \quad fr(u1) - fr(u2) \geq p \vee fr(u1) - fr(u2) < 0 \\ & \qquad \vee seq(u1) \neq seq(u2) \end{cases}$$

where $0<w_1<w_2<\ldots<w_p$, seq(u)=recorded$_{13}$ sequence_number and fr(u)=recorded_frame_number.

14. The method as defined in claim 1 wherein the animation is a talking-head animation, the first database stores sample images of a face that speaks, the second database stores associated facial visual features and the third database stores acoustic information for each frame in the form of phonemes.

15. The method as defined in claim 4 wherein the pose of the object is calculated using the position of the inner and outer corners of the left and right eye and the two nostrils.

16. The method as defined in claim 14 wherein visual features are extracted from normalized images of the mouth area including lips, chin and cheeks.

17. The method as defined in claim 16 wherein the extracted visual features comprise projections onto a set of principal components calculated using principled component analysis on a database of normalized mouth samples.

18. The method as defined in claim 16 wherein the extracted visual features comprise shape and position of the outer and inner lip contour, of the upper and lower teeth and of the tongue.

19. The method as defined in claim 11, wherein the target cost is calculated by the following steps:

a) defining a phonetic context by including in the cost calculation nl frames left of the current frame and nr frame right of it;

b) obtaining a target phonetic vector for each frame t, the target feature vector described as $T(t)=\{ph_{t-nl}, ph_{t-nl-1}, \ldots, ph_{t-1}, ph_t, ph_{t+1}, \ldots, ph_{t+nr-1}, ph_{t+nr}\}$, where $ph_i$ is the phoneme being articulated at frame;

c) defining a weight vector $W(t)=\{w_{t-nl}, w_{t-nl-1}, \ldots, w_{t-1}, w_t, w_{t+1}, \ldots, w_{t+nr-1}, w_{t+nr}\}$;

d) defining a phoneme distance matrix M[p1,p2] that gives the distance between two phonemes;

e) getting a candidate's phonetic vector from the third database $U(u)=\{ph_{t-nl}, ph_{t-nl-1}, \ldots, ph_{t-1}, ph_t, ph_{t+1}, \ldots, ph_{t+nr-1}, ph_{t+nr}\}$; and f) computing the target cost TC, using the following:

$$TC(t,u)=\frac{1}{\sum_{i=-nl}^{nr} w_{t+i}}\sum_{i=-nl}^{nr} w_{t+i}\cdot M(T_{t+i},\ U_{u+i}.$$

20. The method as defined in claim 19, wherein elements of the weight vector are calculated using the following equation: $w_i=e^{-\alpha|t-i|}$.

21. The method as defined in claim 19, wherein the phoneme distance matrix M is populated using similarity between their visemic representation.

* * * * *